United States Patent [19]

Endo

[11] Patent Number: 5,029,515

[45] Date of Patent: Jul. 9, 1991

[54] PNEUMATIC BOOSTER

[75] Inventor: Mitsuhiro Endo, Kanagawa, Japan

[73] Assignee: Tokico Ltd., Kawasaki, Japan

[21] Appl. No.: 575,650

[22] Filed: Aug. 31, 1990

[30] Foreign Application Priority Data

Aug. 31, 1989 [JP] Japan .................. 1-225663

[51] Int. Cl.$^5$ .............................................. F15B 9/10
[52] U.S. Cl. .................. 91/369.1; 91/376 R; 91/369.3; 91/533; 92/49
[58] Field of Search .................. 91/369.1, 369.2, 369.3, 91/376 R, 377, 378, 533; 92/48, 49

[56] References Cited

U.S. PATENT DOCUMENTS

| | | | |
|---|---|---|---|
| 3,362,298 | 1/1968 | Julow | 91/376 R |
| 4,800,799 | 1/1989 | Nishu | 91/369.2 |
| 4,813,337 | 3/1989 | Endo | 91/369.2 |
| 4,854,220 | 8/1989 | Imayoshi | 91/376 R |

FOREIGN PATENT DOCUMENTS

| | | | |
|---|---|---|---|
| 0140187 | 8/1985 | European Pat. Off. | 91/376 R |
| 202968 | 11/1984 | Japan | 91/369.2 |

Primary Examiner—Edward K. Look
Assistant Examiner—F. Daniel Lopez
Attorney, Agent, or Firm—Wenderoth, Lind & Ponack

[57] ABSTRACT

A pneumatic booster comprising a housing, a power piston separating the inside of the housing into a constant pressure chamber and a variable pressure chamber, a valve body attached to the power piston, an output shaft, a plunger slidably received in a bore in the valve body, an input shaft and a valve mechanism in the bore for selectively communicating the variable pressure chamber with a negative pressure source or the atmospheric pressure, the valve mechanism including a valve member mounted on the inner wall of the bore, a first valve seat formed on the inner wall of the bore and a second valve seat formed on the plunger. The booster further comprises a hollow chamber formed within the bore and adapted to communicate with the variable pressure chamber when the valve member rises from the second valve member, a means for detecting actuation of the input shaft, a second valve mechanism adapted to be changed over depending upon a result of detection of the detecting means so as to selectively communicate the hollow chamber with the negative pressure source or the atmospheric pressure. The valve member and the second valve seat are designed to be spaced apart from each other by a predetermined distance when the input shaft positions in its initial or non-operated position.

3 Claims, 8 Drawing Sheets

PNEUMATIC BOOSTER

FIELD OF THE INVENTION

This invention relates to a pneumatic booster for use in the braking system of a vehicle, such as an automobile.

BACKGROUND OF THE INVENTION

Most automobiles are now provided with a pneumatic booster. Pneumatic booster utilizes a pressure difference between a negative pressure occuring in an air intake system of an engine of an automobile and the atmospheric pressure so as to enhance the force generated by depressing a brake pedal and thereby generating a much greater braking force in response to a minimal force applied to a brake pedal.

One example of such a pneumatic booster is shown in FIG. 1.

Referring now to FIG. 1, a housing 3 includes a front shell 1 and rear shell 2. A center plate 4 positioned in the housing 3 divides the inside of the housing 3 into two sections, i.e., front and rear chambers. A front constant pressure chamber 7 and a front variable pressure chamber 8 are defined within the front chamber by means of a front power piston 6 having a diaphragm 5 thereon. A rear constant pressure chamber 11 and a rear variable pressure chamber 12 are also formed in the rear chamber by means of a rear power piston 10 having a diaphragm 9 thereon. The front shell 1 is provided with a negative pressure conduit 13 for connecting the front constant pressure chamber 7 with a negative pressure source, such as an intake manifold (not shown).

The front power piston 6 and rear power piston 10 are secured at their respective inner periphery around the surface of a valve body 15 of a generally cylindrical configuration. The valve body 15 is formed with a recess 14 at the front portion thereof. A return spring 16 is interposed between the portion of the recess 14 of the valve body 15 and the front shell 1 so as to normally urge backward the front power piston 6 and rear power piston 10 through the valve body 15. an output rod 18 is fixedly received within the recess 14, with a reaction disk 17 disposed therebetween. A plunger 19 is reciprocably inserted in an internal bore 21 of the valve body 15 with the fron end thereof being close to the reaction disk 17. The plunger 19 in turn receives the forward end of an input rod 20 in a recess formed in the rearward end thereof. It will be noted that a brake pedal (not shown) is connected to the input rod 20.

The valve body 15 includes a first passage 22 communicating the front variable pressure chamber 8 with the rear variable chamber 12, a second passage 23 communicating the front constant pressure chamber 7 with the rear constant pressure chamber 11, a third passage 24 communicating the rear variable pressure chamber 12 with the internal bore 21, and a fourth passage 25 for communicating the rear constant pressure chamber 11 with the internal bore 21. The valve body 15 also houses therein a poppet valve 26. The poppet valve 26 comprises a valve member 27 attached to the inner periphery of the internal bore 21 at a position rearward of the fourth passage 25, a first valve seat 28 formed around the inner periphery of the internal bore 21 at a position forward of an opening of the fourth passage 25 to the internal bore 21, and a second valve seat 29 formed in the rearward end of the plunger 19. The valve member 27 is so positioned as to be spaced from the first valve seat 28 by the distance of $S_1$ when in an initial state, i.e., when the brake pedal has not yet been depressed.

The third passage 24 also serves as a bore 30 for receiving therein a stop key 32 which will be explained below. The plunger 19 is formed with a groove 31 having a predetermined axial width at a position corresponding to the bore 30. The above-described stop key 32 is freely inserted into the bore 30 and groove 31, the stop key functioning to limit the position of the plunger 19 in the initial state.

With the construction of the pneumatic booster having been described just above, the valve member 27 in the inital states is seated on the second valve seat 29, while rising from the first valve seat 28 as described above. Accordingly and in the inital state, the front constant pressure chamber 7, rear constant pressure chamber 11, front variable pressure chamber 8 and rear variable pressure chamber 12 all are in communication with one another and under a negative pressure.

With the above condition and when a brake pedal is stepped down, the input rod 20 starts to move forwardly. When the input rod 20 has travelled a predetermined stroke or distance which generally corresponds to distance $S_1$ mentioned above, the valve member 27 becomes to be seated on the first valve seat 28 and to rise from the second valve seat 29. Accordingly, atmospheric air is introduced into the rear variable pressure chamber 12 and the front variable pressure chamber 8 through the third passage 24 and the first passage 22. Thus, a pressure difference is caused between the front and rear variable pressure chambers 8 and 12, respectively, into which air at atmospheric pressure has been introduced, and the front and rear constant pressure chambers 7 and 11, respectively, which are under a negative pressure. By virtue of this pressure difference, the valve body 15 and output rod 18 are forwardly driven with substantial force by means of the front power piston 6 and the rear power piston 10.

It is to be understood that a brake mechanism having a shorter pedal travel, i.e., displacement of a brake pedal during an initial stage of braking operation, is desirable. With the construction of the above prior art pneumatic booster, however, a booster action will be exerted only after the output rod 18 has travelled a predetermined stroke and thereafter the atmospheric pressure is introduced into the front and rear variable pressure chambers 8 and 12, respectively. Thus, the prior art pneumatic booster has a drawback in that a relatively long pedal travel is required and hence it does not substantially satisfy the above requirement. In this connection, it is noted that an attempt to create an immediate booster action has been made. Accoding to this attempt, a dimension of the width of each of the stop key 32 and the bore 30 is appropiately selected so that the valve member 27 will be able to be seated on both the first valve seat 28 and second valve seat 29 when in the above initial state. With this construction, the valve member 27 rises from the second valve seat 29 so as to introduce atmospheric air into the front variable pressure chamber 8 and the rear variable pressure chamber 12, immediately upon commencement of a forward movement of the input rod 20, thereby causing a simultaneous booster action. It should be noted however that, in the above construction, the amount of displacement for which the output rod 18 has travelled during the initial braking operation corresponds at most to the displacement of the input rod 20. Thus, above attempt is also insufficient in terms of significantly reducing the amount of pedal travel.

SUMMARY OF THE INVENTION

The present invention is aimed at the elimination of the above prior art problems by providing an improved pneumatic booster which will be able to significantly and advantageously reduce the amount of required pedal travel.

A pneumatic booster according to the present invention comprises a housing, a power piston having a diaphragm thereon and separating the inside of the housing into a constant pressure chamber and a variable pressure chamber, a valve body attached to the inner periphery of the power piston for forward and rearward movement within the housing, an output shaft attached to the valve body, a plunger slidably received in a bore in the valve body, an input shaft connected to the plunger, and a valve mechanism in the bore for cooperating with the input shaft to selectively communicate the variable pressure chamber with a negative pressure source or the atmospheric pressure, the valve mechanism including a valve member mounted on the inner wall of the bore, a first valve seat formed on the inner wall of the bore and a second valve seat formed on the plunger. The pneumatic booster further comprises a hollow chamber formed within the bore at a position rearward of the valve member and adapted to communicate with the variable pressure chamber when the valve member rises from the second valve member, a means for detecting actuation of the input shaft, a second valve mechanism adapted to be changed over depending upon a result of detection of the detecting means so as to selectively communicate the hollow chamber with the negative pressure source or the atmospheric pressure. The valve member and the second valve seat are designed to be spaced apart from one another by a predetermined distance when the input shaft positions in its initial or non-operated position.

according to one embodiment of the invention, the detecting means includes a member displaceable interlockingly with the input shaft, and wherein the second valve mechanism includes a member adpated to cause a change over action of the second valve member in response to displacement of the member of the detecting means.

According to another embodiment of the invention, the second valve mechanism includes a solenoid for causing the change over action of the second valve mechanism, and wherein the detecting means include a means for transmitting an electrical signal to the solenoid in response to the actuation of the input shaft.

DESCRIPTION OF THE PREFERRED EMBODIMENT

Several embodiments according to the invention will be explained below with reference to the drawings.

Figure 1:
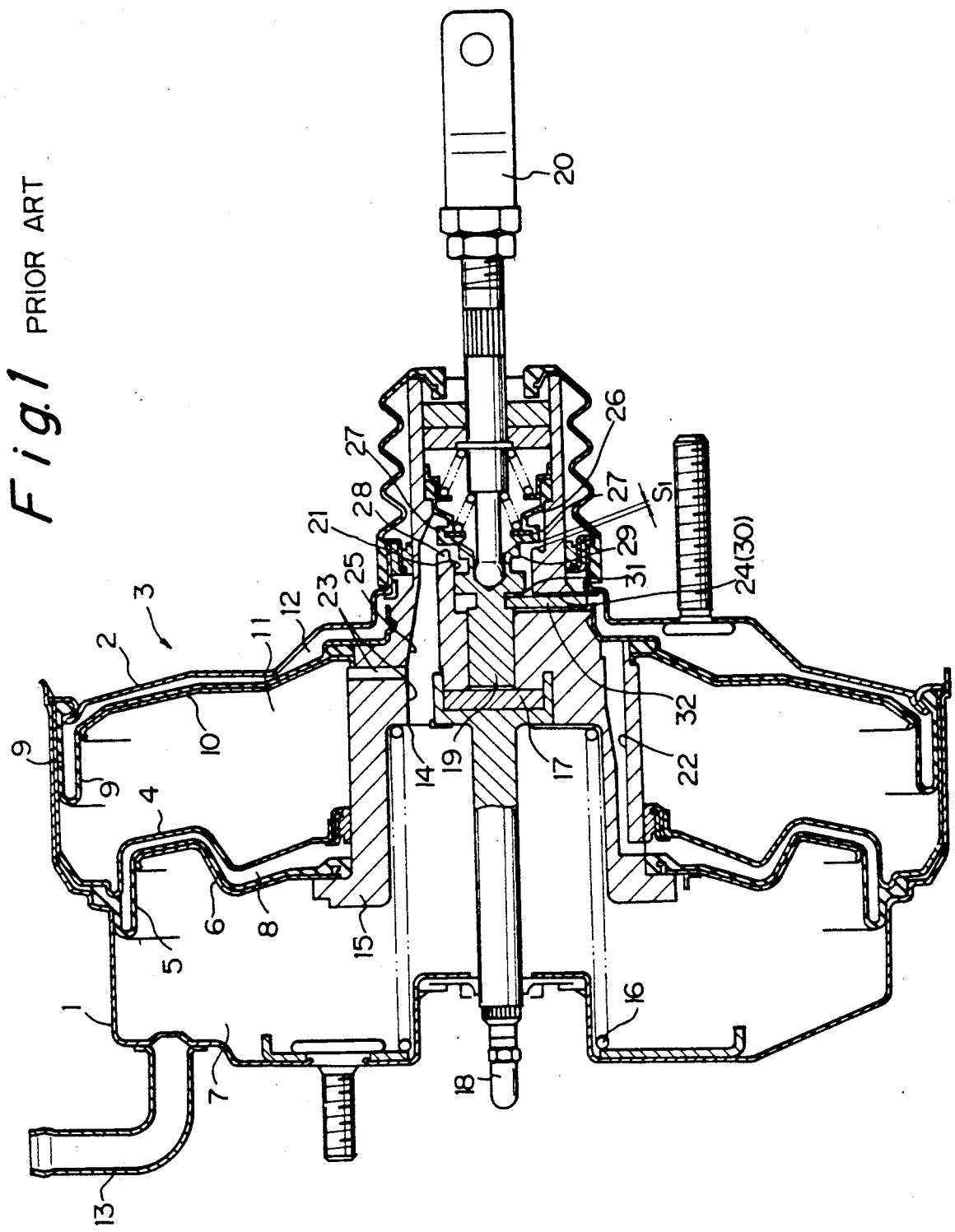
FIG. 1 is a cross-sectional view illustrating an example of prior art pneumatic booster.
Figure 2:
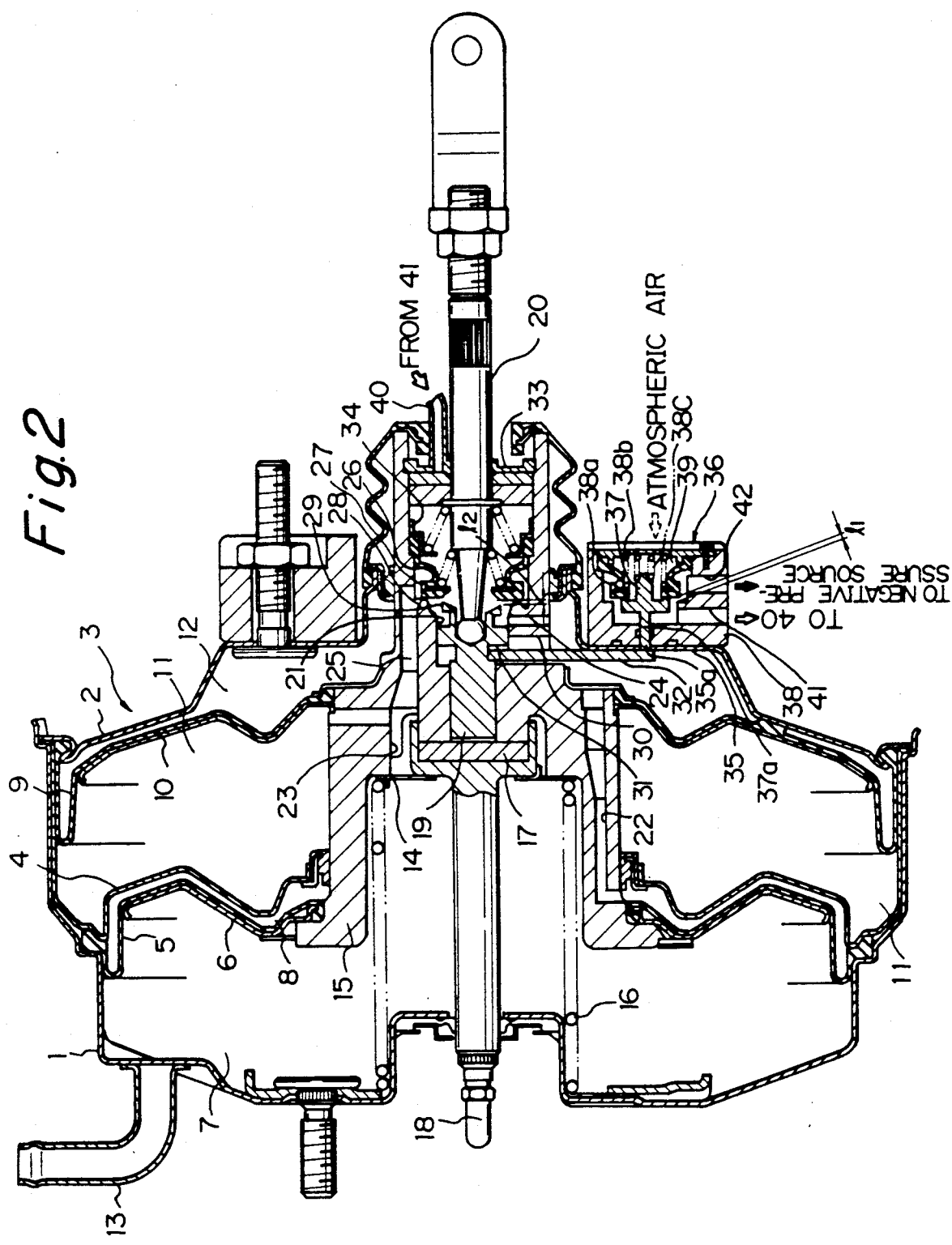
FIG. 2 is a cross-sectional view illustrating a pneumatic booster according to a first embodiment of the invention.
Figure 3:
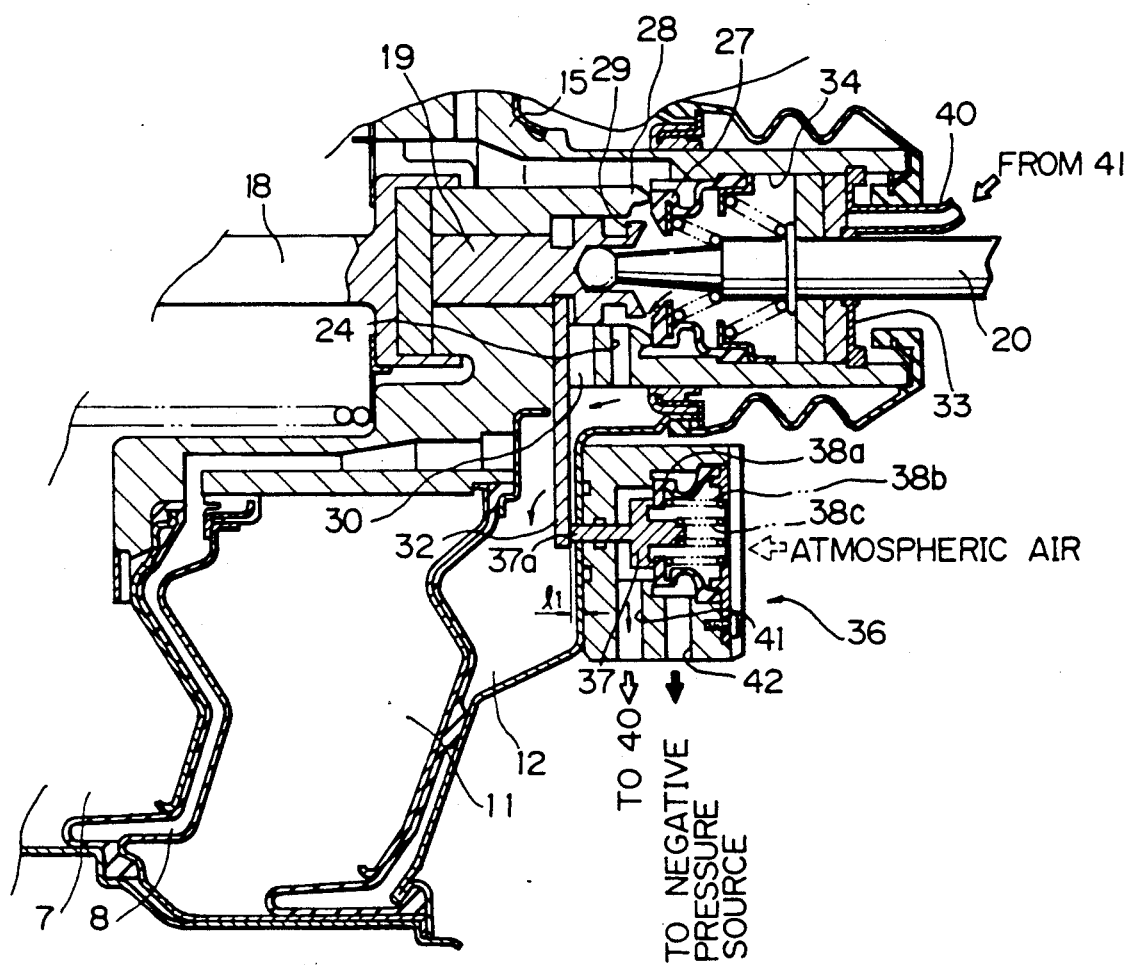
FIGS. 3 and 4 illustrate operational condition of the pneumatic booster of FIG. 2, FIG. 3 being a cross-sectional view showing a state in which atmospheric air is introduced into variable pressure chambers during an initial stage of the actuation of a brake pedal, and FIG. 4 being a cross-sectional view showing a state that introduction of air at atmospheric pressure into the variable chambers has been completed.
Figure 4:
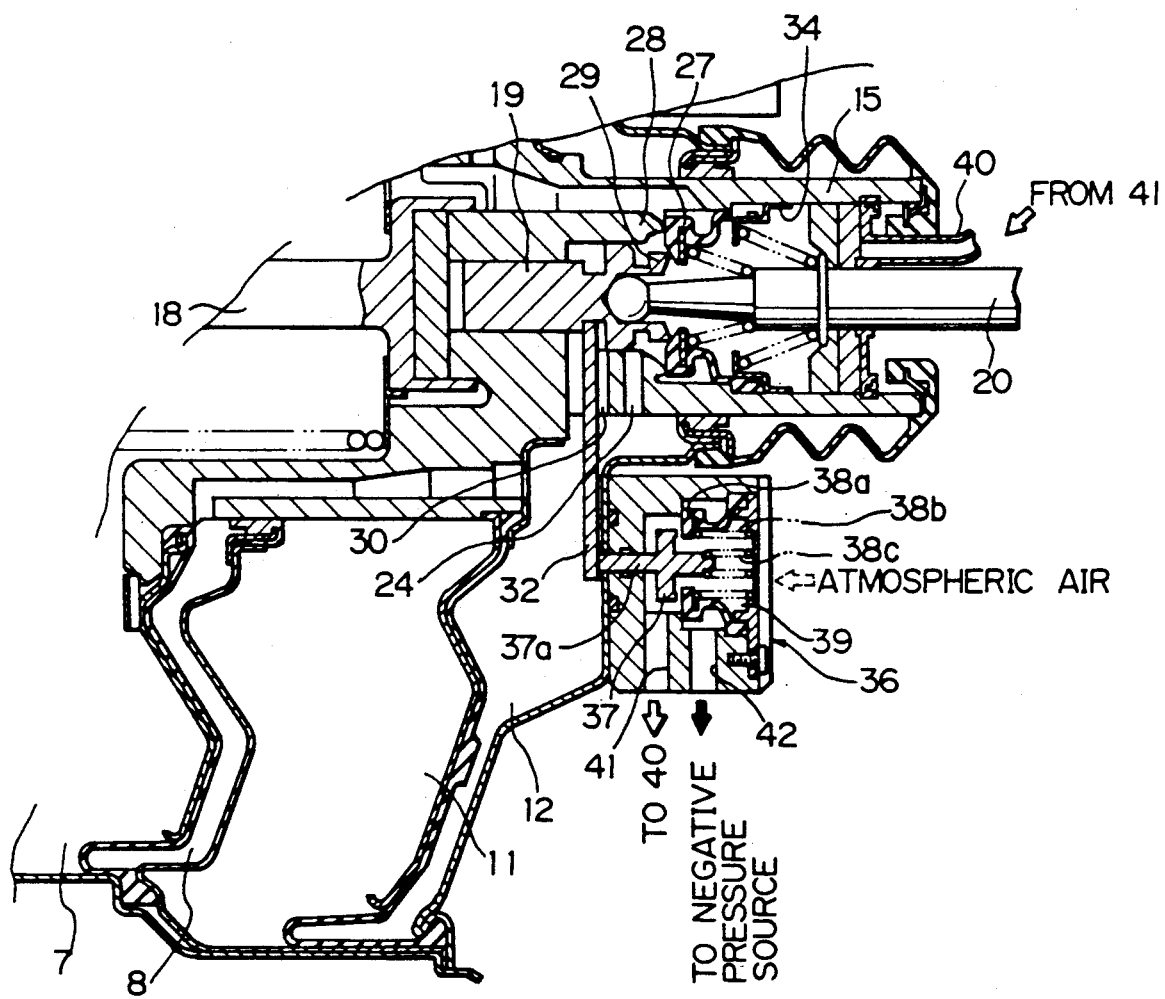

FIGS. 2 through 4 illustrate a first embodiment of the invention. The first embodiment will be explained with reference to FIGS. 2 through 4, togehter with FIG. 8. In this connection, it is to be noted that the parts or components in FIGS. 2 through 7 similar to those in FIG. 1 will be designated by the same reference numerals as used in FIG. 1 and that explanation thereof will be omitted in the following description for the purpose of avoiding repetition.

Referring to the drawings, a valve body 15 has at the rearward portion thereof a wall member 33 attached thereto for sealing an internal bore 21. Thus, a hollow chamber 34 is defined between the wall member 33 and a poppet valve 26. The valve body 15 is formed with an aperture 30 parallel to and located forwardly of a third passage 24. A stop key 32 is freely inserted into the aperture 30 and also into a groove 31 formed in a plunger 19. The stop key 32 is in abutment engangement at the upper portion thereof with a forward wall of the groove 31. The lower portion of the stop key 32 protrudes from the valve body 15 so as to be in abutment engagement with a flat portion 35 formed in a rear shell 2. A second valve 36 is secured to the outside surface of the flat portion 35.

The second valve 36 includes a valve housing 38 and a plunger 37 disposed within the valve housing 38 and having a shaft 37a formed thereon which extends through an aperture 35a formed in the flat portion 35 so as to be engageable with the stop key 32. The valve housing 38 is formed with an atmospheric air passage 39 for introduction of the atmospheric air, a passage 41 connected to a conduit 40 extending through the wall member 33 for fluid communication with the hollow chamber 34, and a passage 42 communicating with a negative pressure source. Inside the valve housing 38, there are provided a valve meber 38a for changeably communicating the passage 41 communicating with the hollow chamber with the atmospheric air passage 39 or the passage 42 communicating with the negative pressure source, and an outer and inner spring 38b, 38c respectively for urging the tip of the valve member 38a and the plunger 37 toward the stop key 32. Normally, the passage 41 communicating with the hollow chamber and the passage 42 communicating with the negative pressure source are communicated with each other. When the tip of the valve member 38a has travelled forwardly a distance $l_1$, the second valve 36 is changed over so as to communicate the atmospheric passage 39 with the passage 41 and so as to prevent communication between the passage 41 and the passage 42. Furthermore and as wil be explained later, the second valve 36 is adapted to be changed over when the input rod 20 travels forwardly and the stop key 32 associated there-with has travelled for a distance $l_1$. Thus, according to this embodiment, the stop key 32 constitutes an actuation detecting means.

In the initial state (illustrated in FIG. 2), the valve member 27 of the poppet valve 26 remains seated on the first valve seat 28, but rises from the second valve seat 29 by a distance $l_2$. In this condition, the rear variable pressure chamber 12 communicates with the hollow chamber 34 through the poppet valve 26 and the hollow chamber 34 in turn communicates with the negative pressure source, thus maintaining all of the front and rear variable pressure chambers 12 and 8, respectively, and the front and rear constant pressure chambers 7 and 11, respectively, under negative pressure.

With the pneumatic booster constructed in accordance with the above, when a driver depresses the brake pedal, the input rod 20 moves forwardly relative to the valve body 15, simultaneously causing forward movement of the plunger 19. As a result, the stop key 32 becomes free to move forwardly, and hence the plunger 37 pushes the stop key forwardly by the action of the inner spring 38c which biases the plunger in a forward direction. In accordance with the forward movement of the stop key, the tip of the valve member 38a of the second valve 36 is displaced forwardly by the outer spring 38b. When the amount of displacement of the valve member 38a reaches a predetermined value (a distance corresponding to distance $l_1$), the second valve 36 will be changed over as shown in FIG. 3 so as to communicate the passage 41 to the hollow chamber with the atmospheric air passage 39, thereby introducing the atmospheric air into the rear variable pressure chamber 12 and the front variable pressure chamber 8 through the hollow chamber 34 and the poppet valve 26.

Figure 8:
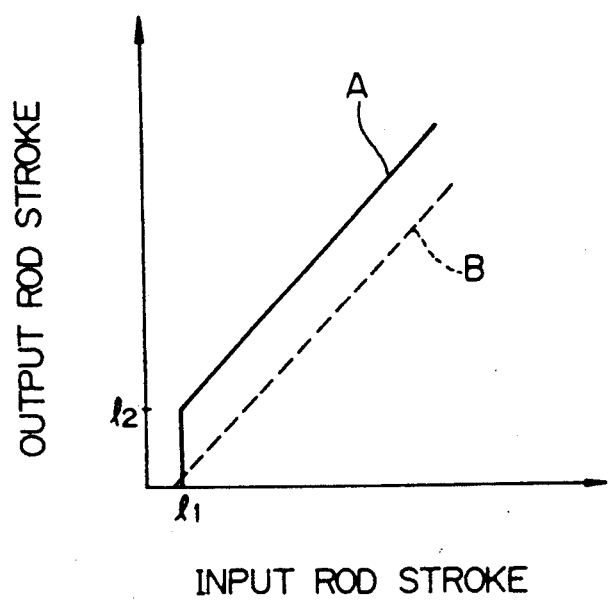
FIG. 8 is a diagram illustrating characteristic of stroke of the input rod relative to that of the output rod.

The introduction of air at atmospheric pressure into the variable pressure chambers causes a momentary movement of the valve body 15 and the output rod 18 in the forward direction for distance $l_2$ as illustrated by the solid line A in FIG. 8, thereby causing the valve member 27 to be seated on the second valve seat 29 (see FIG. 4).

As described above, minimal displacement of the input rod 20 during the initial stage of a braking operation causes a considerable amount of forward movement of the output rod 18, thus correspondingly reducing the amount of pedal travel. For comparative purposes, the relationship in stroke between the input rod and output rod in accordance with the prior art apparatus as obtained in a manner similar to that of the embodiment is illustrated by the dotted line B in FIG. 8. It will be seen from this figure that a much greater stroke of the output rod in the initial stage of a braking operation can be obtained in the embodiment of the present invention relative to the prior art apparatus.

When a further step down action is applied to the brake pedal of FIG. 4, the input rod 20 moves forwardly in the direction of the valve body 15 so as to cause the valve member 27 to rise from the second valve seat 29. Thus, atmospheric air is introduced from the hollow chamber 34 through the third passage 24 into the rear and front variable pressure chambers 12 and 8, respectively. Accordingly, the output rod 18 is pushed forwardly in response to the forward movement of the input rod 20 as a result of advantageous utilization of the pressure difference between the atmospheric pressure and the negative pressure.

When the step down action of the brake pedal is released, the input rod 20 moves rearwardly so that the valve member 27 is seated on the second valve seat 29 and rises from the first valve seat 28. Accordingly, the atmospheric pressure in the variable pressure chambers 8 and 12 is expelled to the constant pressure chambers 7 and 11. By this arrangement, any pressure difference is eliminated between the variable pressure chambers 8 and 12, and the constant pressure chambers 7 and 11 so that the front and rear power piston 6, 11 more rearwardly, together with the valve body 15. When the plunger 19 returns to a position rearward of the position shown in FIG. 4, the second valve is changed over so as to communicate the hollow chamber 34 with the negative pressure source and so as to expel the air at atmospheric pressure out of the hollow chamber, thus retaining the pneumatic booster to its initial state.

Figure 5:
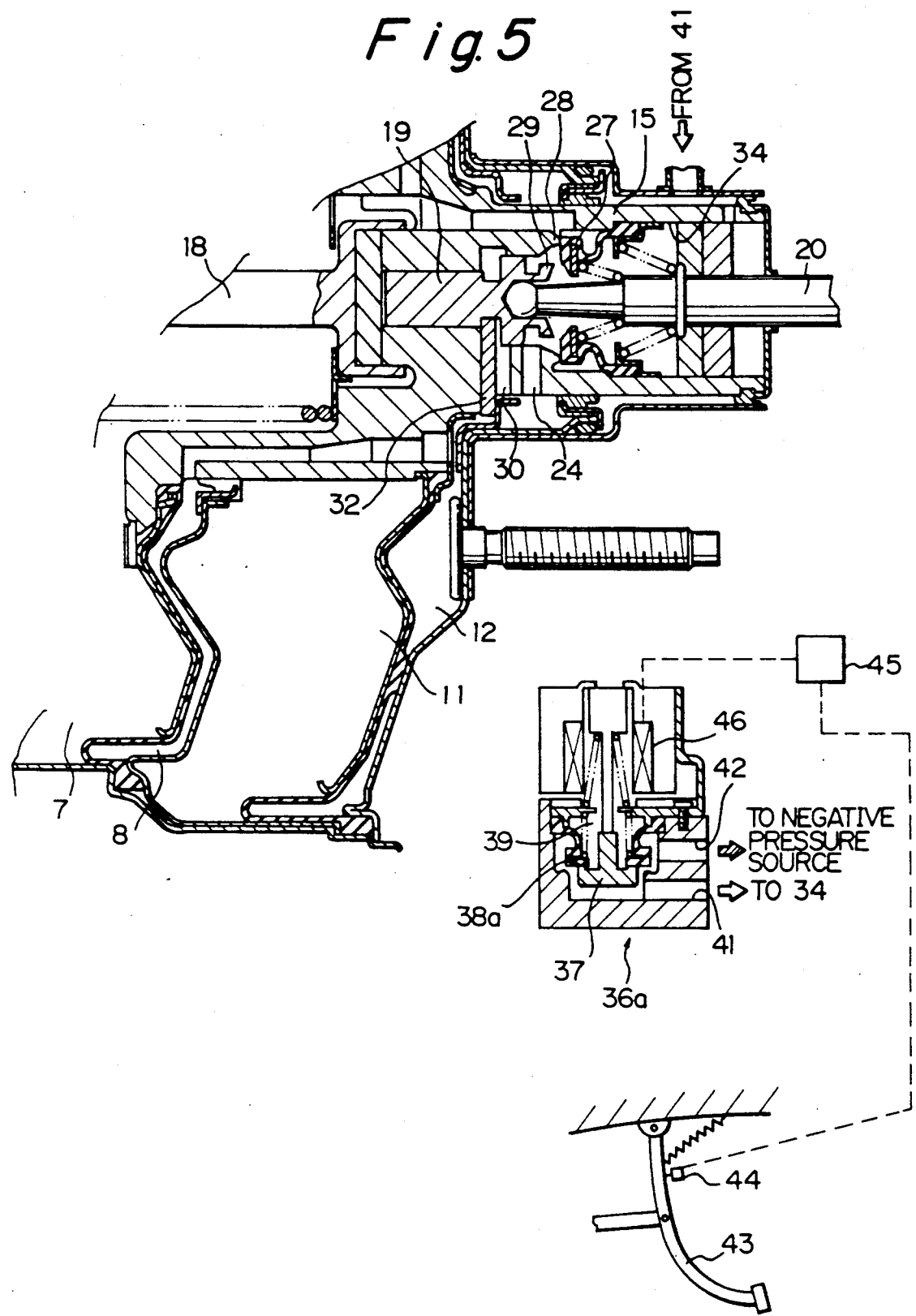
FIG. 5 is a cross-sectional view showing a second embodiment of the invention.

FIG. 5 illustrates a second embodiment of the present invention. This embodiment differs from the first embodiment in the point that it includes an actuation detecting means and a control circuit for the second valve. The remaining components are identical to those of the first embodiment and, for this reason, explanation of the remaining components is omitted to avoid repetition; they are designated by the same reference numerals as those of the first embodiment. With reference to FIG. 5, a control circuit 45 is provided. The control circuit 45 is connected to a switch 44 (actuation detecting means) for a stop lamp adapted to ligh up when a brake pedal 43 is depressed and is adapted to output a predetermined value of electric current in response to the switch 44 being turned "on". A second valve 36a is provided with a solenoid 46 which is adapted to be energized by an electrical current from the control circuit 45, so that a plunger 37 and hence a valve member 38a are displaced so as to cause a change over action of the valve 36a. With the construction of the second embodiment, the change over action of the second valve 36a is caused simultaneously with the initiation of step down motion of the brake pedal 43, thus achieving a degree of responsiveness much higher than that expected from the first embodiment. In this connection, it will be understood by one having ordinary skill in the art that the switch 44 can be replaced with a strain gage adapted to detect the input force or a pizoelectric element attached to a tread surface of the brake pedal 43 for detecting brake pedal actuation for the purpose of performing a change over action of the valve 36a. When such an electrical detection of a brake pedal actuation is performed, the input rod etc. is returned to the initial state much faster than in the first embodiment because the pressure in a hollow chamber 34 will be reduced simultaneously with the stoppage of the brake pedal actuation.

Figure 6:
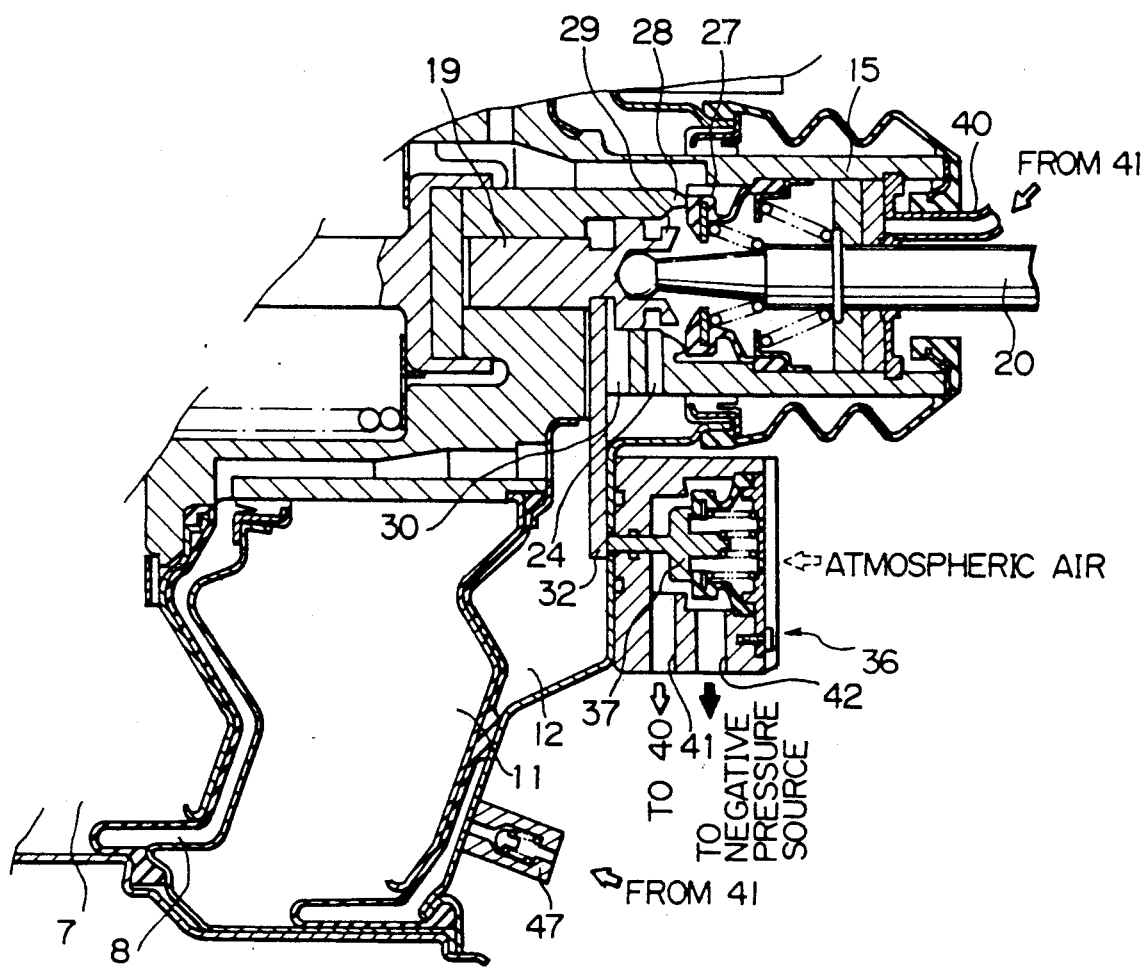
FIG. 6 is a cross-sectional view showing a third embodiment of the invention.

FIG. 6 illustrates a third embodiment of the present invention. This embodiment differs from the first embodiment in the point that it includes a check valve 47. The remaining components are identical to those of the first embodiment and, for this reason, explanation of the remaining components is omitted to avoid repetition; they are designated by the same reference numerals as those of the first embodiment. In the illustrated embodiment, the check valve 47 in communication with a rear variable pressure chamber 12 is attached to the a shell 2. A piping connecting a conduit 40 with a passage 41 communicating with the hollow chamber is branched off at an intermediate point thereof to connect the check valve 47 to the passage 41. The check valve 47 is adapted to allow the atmospheric air flowing from a rear variable pressure chamber 12 into the second valve 36. With the construction of the third embodiment, the atmospheric air having entered the variable pressure chambers 12 and 8 can be reliably expelled through the check valve 47 upon a return action of the brake pedal, thus obviating any possibility of atmospheric air remaining in the variable pressure chambers 12 and 8.

Figure 7A:
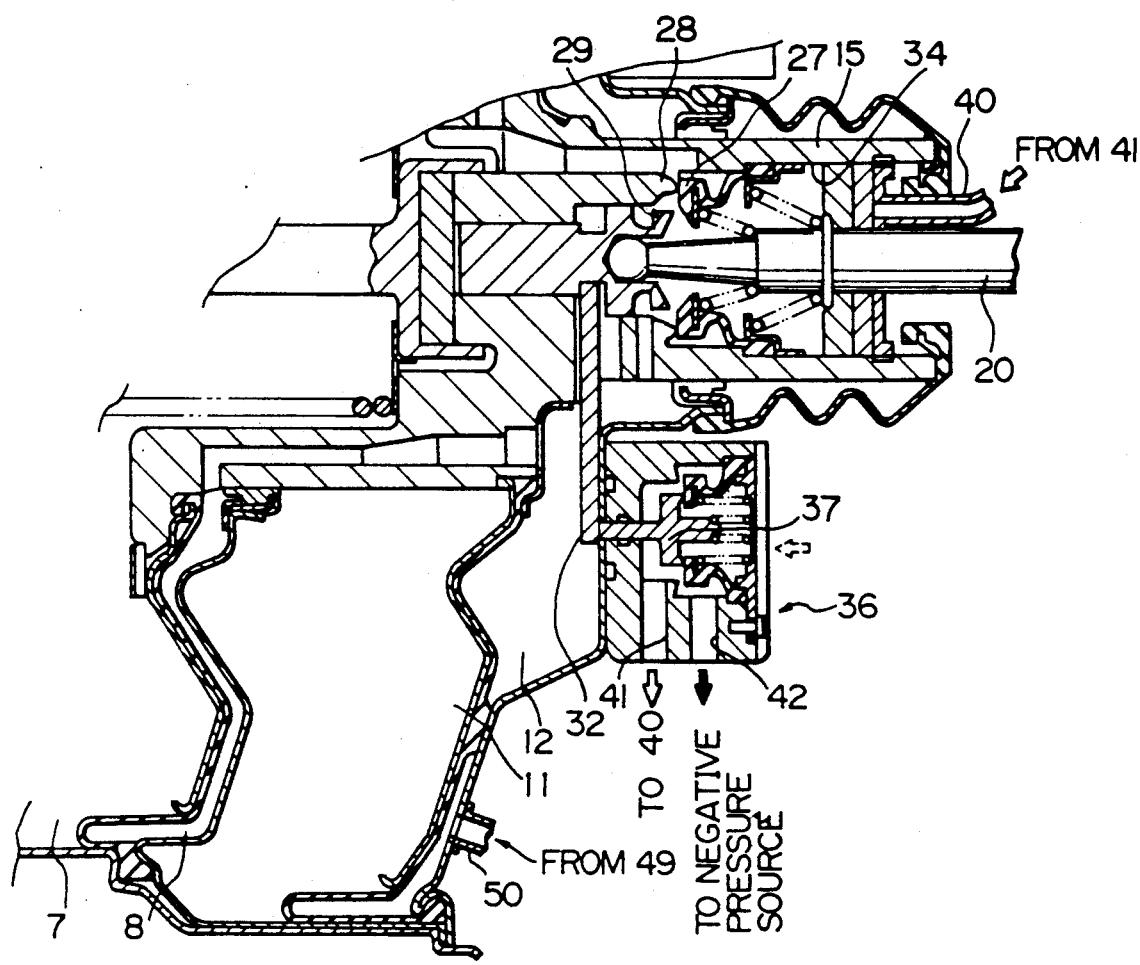
FIGS. 7a and 7b illustrate a fourth embodiment of the invention, FIG. 7a a cross-sectional view illustrating a valve body and a second valve, and FIG. 7b being a cross-sectional view illustrating a third valve.
Figure 7B:
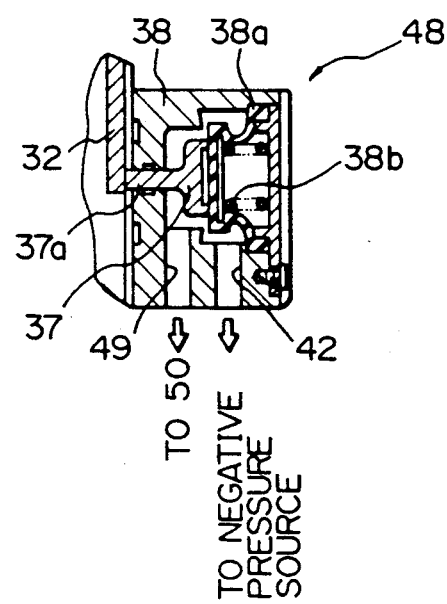

FIG. 7 illustrates a fourth embodiment of the present invention. In the illustrated embodiment, a third valve 48 is employed in place of the check valve 47 of the third embodiment. The third valve 48 includes within a valve housing 38 a plunger 37 formed with a shaft 37a thereon engageable with a stop key 32. The valve housing 38 is formed therein a passage 49 connecting to a rear variable chamber 12 through a conduit 50, and a passage 42 communicating with a negative pressure source. The valve housing 38 is also provided therein with a valve member 38a for changing open/close state of communication between the passage 49 to the rear variable pressure chamber and the passage 42, and a spring 38b urgedly biasing the valve member 38a and plunger 37 toward the stop key 32. In this connection, it is noted that, in the initial state, the passage 49 to the rear variable chamber and passage 42 communicate with each other as shown in FIG. 7, while the valve 48 is adapted to be changed over by a forward movement of the stop key 32 so as to block communication between the two passages 49 and 42. With the construction of the fourth embodiment, the atmospheric air having entered the variable chambers 12 and 8 can be surely expelled through the valve 48 upon return movement of the brake pedal.

It should be understood that, though the above embodiments have been explained by exemplifying a "tandem" type in which two pairs of constant pressure chambers and variable pressure chambers are defined by diaphragms, the present invention should not be interpreted as being applicable solely to the "tandem" type, and is also applicable to a "single" type in which a pair of constant pressure chamber and variable pressure chamber is defined by means of a diaphragm.

As described above, according to the present invention, a step down motion of the brake pedal causes atmospheric air to be introduced into a variable pressure chamber through a hollow chamber and a second valve so that a output rod displaces a distance corresponding to the distance between the valve member and the valve seat therefor of the valve mechanism for opening and closing the passage between the variable pressure chamber and the hollow chamber, thereby displacing the output rod a greater distance in the initial stage of the actuation of the brake pedal, and correspondingly reducing the amount of pedal travel.

What is claimed is:

1. A pneumatic booster comprising a housing, a power piston having a diaphragm thereon and separating the inside of the housing into a constant pressure chamber and a variable pressure chamber, a valve body attached to the inner periphery of said power piston for forward and rearward movement within said housing, an output shaft attached to said valve body, a plunger slidably received in a bore in said valve body, an input shaft connected to said plunger, and a valve mechanism in said bore for cooperating with said input shaft to selectively communicate said variable pressure chamber with a negative pressure source or the atmospheric pressure, said valve mechanism including a valve member mounted on the inner wall of said bore, a first valve seat formed on said inner wall of said bore and a second valve seat formed on said plunger, characterized by further comprising a hollow chamber formed within said bore at a position rearward of said valve member and adapted to communicate with said variable pressure chamber when said valve member rises from said second valve member, a means for detecting actuation of said input shaft, a second valve mechanism adapted to be changed over depending upon a result of detection of said detecting means so as to selectively communicated said hollow chamber with said negative pressure source or said atmospheric pressure, said valve member and said second valve seat being designed to be spaced apart from each other by a predetermined distance when said input shaft positions in its initial or non-operated position.

2. A pneumatic booster according to claim 1, wherein said detecting means includes a member displaceable interlockingly with said input shaft, and wherein said second valve mechanism includes a member adapted to cause a change over action of said second valve member in response to displacement of said member of said detecting means.

3. A pneumatic booster according to claim 1, wherein said second valve mechanism includes a solenoid for causing the change over action of said second valve mechanism, and wherein said detecting means includes a means for transmitting an electrical signal to said solenoid in response to the actuation of said input shaft.

* * * * *